Figure 1:
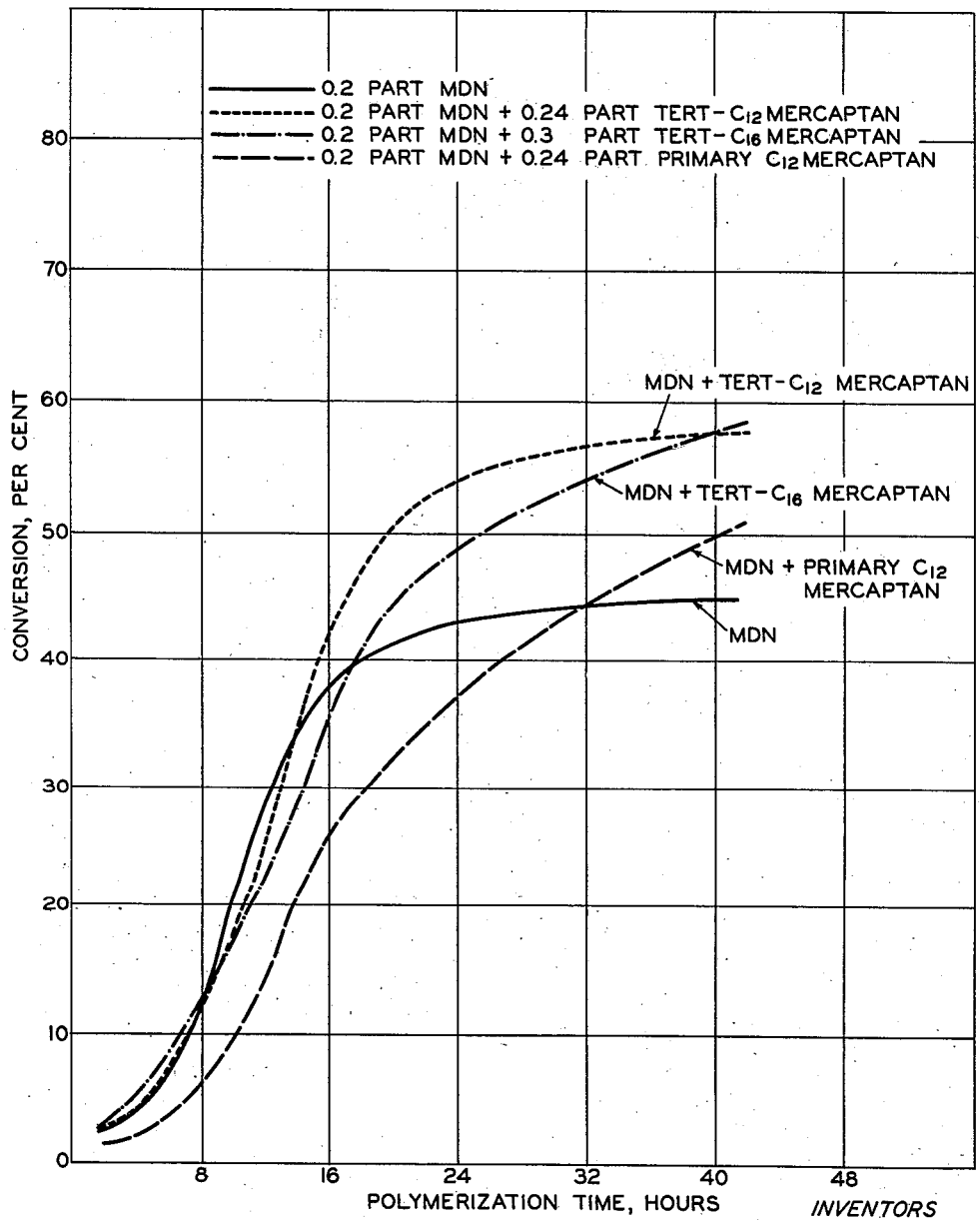

INVENTORS
C. F. FRYLING
J. E. PRITCHARD

Patented June 2, 1953

2,640,821

UNITED STATES PATENT OFFICE 2,640,821

POLYMERIZATION PROCESS

James E. Pritchard, Lafayette, Ind., and Charles Frederick Fryling, Phillips, Tex., assignors to Phillips Petroleum Company, a corporation of Delaware Application December 16, 1946, Serial No. 716,640

2 Claims. (Cl. 260—84.3)

This invention relates to the polymerization of unsaturated organic compounds capable of undergoing an addition polymerization in an aqueous emulsion to form high molecular weight polymers. In one of its more specific aspects it relates to the polymerization of an aliphatic conjugated diene hydrocarbon, including substituted derivatives, either alone or in admixture with a monomer copolymerizable therewith to form long chain polymers of the type known as synthetic rubbers. The invention is particularly useful for the polymerization of a butadiene-1,3 hydrocarbon and a monomer copolymerizable therewith in an aqueous dispersion. In accordance with this invention the polymerization is carried out in the presence of compounds which impart combined effects as initiators and modifiers for the polymerization reaction. The invention further relates to the production of high quality polymers through the use of selected mercaptans in an emulsion polymerization recipe containing diazo thioethers as initiators.

Synthetic rubber is made by the polymerization of polymerizable organic compounds under controlled polymerization conditions. The term "synthetic rubber" is used broadly to include products resulting from the polymerization of olefins, diolefins, styrene and its derivatives, alkyl esters of acrylic and alkacrylic acids (e. g., methyl methacrylate), and other compounds having at least one active vinylidene ($CH_2=C<$) group. These compounds are polymerized alone or in admixture with one another to form products having some of the characteristic properties of rubber. When a mixture of two or more of these compounds is subjected to polymerization conditions, a copolymer is formed in which the components combine to form molecules of high molecular weight by linking together of the different individual component monomers. Of particular importance in the synthetic rubber field are copolymers of an aliphatic conjugated diolefin, particularly butadiene, and a suitable comonomer. Butadiene may be polymerized with various known comonomers such as styrene, derivatives of styrene containing an active vinylidene ($CH_2=C<$) group, acrylonitrile, methacrylonitrile, methyl acrylate, methyl methacrylate, and the like.

It is well known that copolymers of the GR-S type are inferior for use as synthetic rubber unless the polymerization is carried out in the presence of certain additive substances designated as modifying agents. The general function of modifying agents is to eliminate or to substantially reduce the formation, between polymer units, of cross linkages and branches leading to the production of gel-type products which render the polymerizates deficient in desirable rubber-like properties.

In the manufacture of synthetic rubber it is necessary to carry out the reaction under conditions that will insure a polymer of high quality and, at the same time, maintain the operations at a level which will be economically feasible for large scale production. It is obvious that a reduction in reaction time would be desirable from an economic viewpoint. An obvious expedient to reduce the reaction time would involve an increase in reaction temperature; however, it is well known that the quality of the product is rapidly degraded with increasing temperatures. It is possible, through the use of certain additive agents, to accelerate the reaction and eliminate the accompanying harmful effects which result from an elevation in temperature. Diazo thioethers, as disclosed in the copending patent application of Reynolds and Cotten, Serial No. 641,866, filed January 17, 1946, now Patent 2,501,692, granted March 28, 1950, are particularly effective for this purpose.

An object of this invention is to provide an improved process for the polymerization of unsaturated organic compounds to form high molecular weight polymers. Another object is to provide an improved process for the copolymerization of a conjugated diolefin and a monomer copolymerizable therewith in an aqueous emulsion. Still another object is to provide compounds particularly suited as initiators and modifiers in the emulsion polymerization of polymerizable organic compounds. Another object is to provide a process wherein the reaction rate in an emulsion polymerization reaction is regulated through the use of compounds which impart combined effects as initiators and modifiers and thereby produce polymers of superior quality. Other objects and advantages of the present invention will be apparent to those skilled in the art from the accompanying detailed disclosure.

We have now found a method whereby the regularity in the rate of polymerization reactions is insured and polymers possessing a high degree of uniformity and satisfactory processing characteristics are produced through the addition to the polymerization recipe of relatively small quantities of diazo thioethers in admixture with mercaptans. Diazo thioethers perform the dual function of activators and modifiers in a polymerization recipe. However, when diazo-thioethers are employed, per se, as modifiers as well as activators, relatively large quantities are required to insure proper modification. We have found that polymerization reactions can be carried out at a satisfactory rate with adequate modification insured throughout the course of the reaction by employing relatively small quantities of diazo thioether-mercaptan mixtures as modifier-activators rather than diazo thioethers alone. Thus, when a mercaptan is employed in admixture with a diazo thioether in a given polymerization recipe, the reaction proceeds with much greater regularity, the polymer possesses more uniform characteristics, and the temperature is more easily regulated than when the diazo thioether is used alone. A further advantage of our invention lies in the ultimate yield of product, there being an increase in the conversion of monomeric material obtained when the reaction is carried out in the presence of our additive agents. A still further advantage lies in the low cost and availability of the mercaptans which are employed in these additive mixtures.

The polymerization of a polymerizable organic monomeric material, either alone or in admixture with a monomer copolymerizable therewith, may be carried out in a homogeneous system or in a heterogeneous system, for example, in an aqueous dispersion or emulsion. In accordance with the present invention, it is preferred to carry out the polymerization in an aqueous emulsion. The term "emulsion" as used herein is to be construed in its broadest sense, that is, as denoting the presence of an aqueous phase and an oil phase without regard to the extent of dispersion of one in the other. In general, emulsion polymerization is carried out in an aqueous dispersion, i. e., the monomers are dispersed in water, usually with the aid of a dispersing or emulsifying agent and agitation. Emulsifying agents which are suitable for this purpose include partially or completely neutralized fatty acid soaps, sodium lauryl sulfate, sodium isobutyl naphthalene sulfonate, sulfated and sulfonated succinic esters, and the like.

The use of a diazo thioether in conjunction with a mercaptan in accordance with this invention may be applied to the polymerization of conjugated diolefins. It is particularly useful for the copolymerization of a conjugated diolefin and at least one other unsaturated compound copolymerizable with the diolefin. Suitable diolefins include 1,3-butadiene, isoprene, 2,3-dimethylbutadiene, piperylene, and the like. Compounds copolymerizable with conjugated diolefins contain an active vinylidene ($CH_2=C<$) group and comprise aryl olefins (e. g. styrene, p-chlorostyrene, p-methoxystyrene, vinylnaphthalene, etc.); vinylfuran, vinylpyridine, vinylthiophene, vinylquinoline, and the like; alkyl esters of acrylic acid (e. g. methyl acrylate, ethyl acrylate, butyl acrylate, etc.); esters of substituted acrylates (e. g., methyl methacrylate, ethyl methacrylate, butyl methacrylate, methyl ethacrylate, etc.); nitriles of acrylic acids (e. g. acrylonitrile, methacrylonitrile, etc.); vinylidene chloride; vinyl ketones (e. g. methyl vinyl ketone); vinyl ethers (e. g. methyl vinyl ether); vinylcarbazole; and other unsaturated compounds. The present invention is especially useful for the copolymerization of a conjugated diolefin containing from four to six carbon atoms and a comonomer, such as styrene, acrylonitrile, methyl acrylate, and methyl methacrylate.

Figure 2:
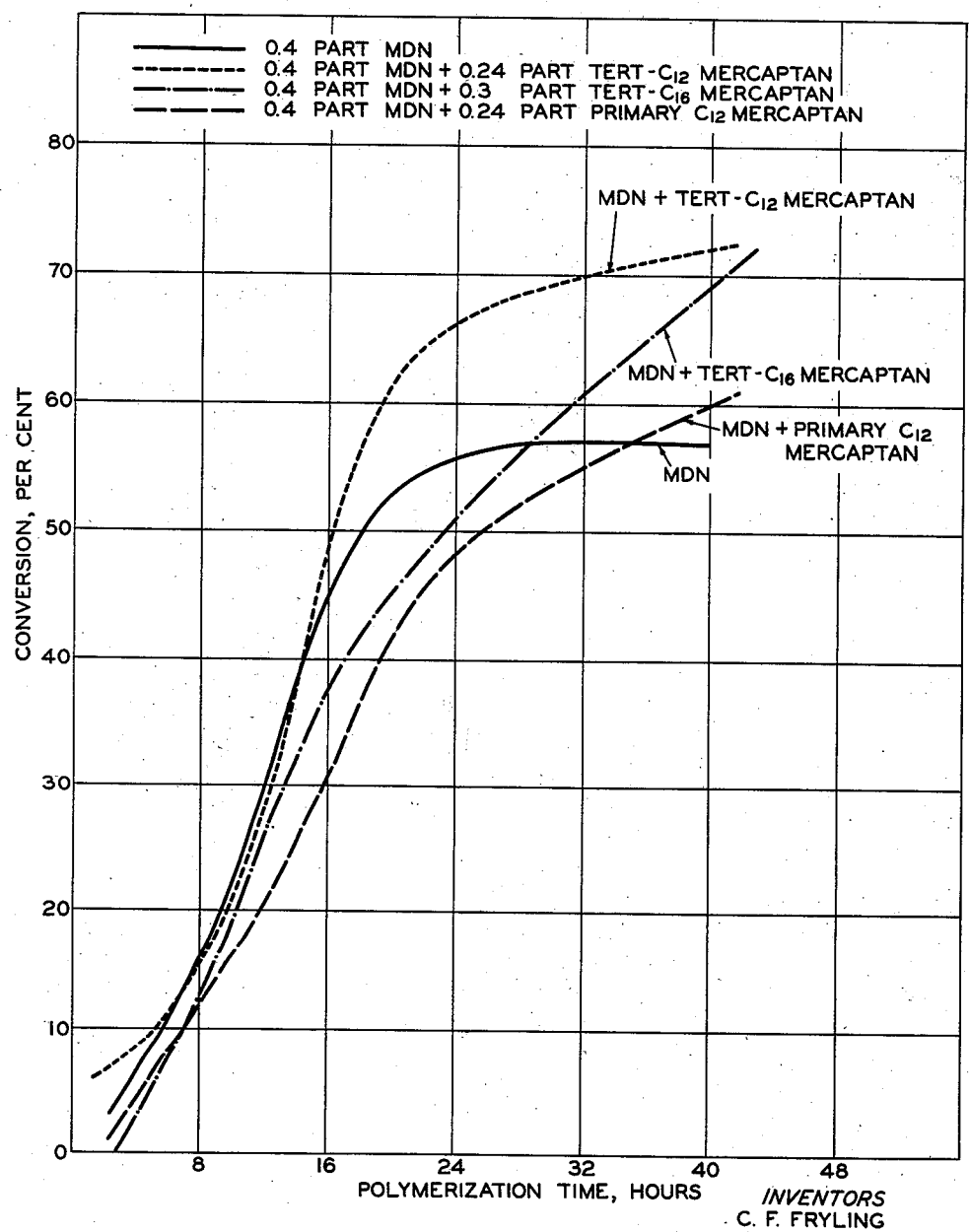

Figure 1 of the drawings illustrates graphically the relationship of monomer conversion (in weight per cent) and reaction time for polymerization with various promoter-modifier combinations. Figure 2 of the drawings is similar to Figure 1 and shows the effect, on monomer conversion, of increasing the quantity of diazo thioether.

The diazo thioethers used in the process of the present invention have the general structural formula $$R-N=N-S-R'$$

where R is a member of the group consisting of aromatic and substituted aromatic radicals and R' is a member of the group consisting of aromatic, substituted aromatic, cyclo-alkyl, substituted cyclo-alkyl, aliphatic and substituted aliphatic radicals. These diazo thioethers may be be made by the combination of a diazotized aromatic amine and an aromatic, cycloalkyl or aliphatic mercaptan, including substituted derivatives.

The diazo thioethers preferred for use as polymerization catalysts in accordance with the present invention are those in which both R and R' in the foregoing structural formula are aromatic or substituted aromatic groups. Examples of the preferred compounds are substituted phenyl diazo thio-(naphthyl) ethers, phenyl diazo thio-(phenyl) ethers, naphthyl diazo thio-(phenyl) ethers, and naphthyl diazo thio-(naphthyl) ethers. Preferred substituent groups are the alkyl, alkoxy, aryloxy (e. g., phenoxy), carboxy, sulfonic acid, halo, and nitro groups. Other substituents give diazo thioethers of varying degrees of usefulness. The diazo thioethers herein described may be either the water soluble or oil soluble type.

The mercaptans employed in the diazo thioether-mercaptan mixtures of this invention are preferably tertiary mercaptans, especially those selected from the group having from about eight to about twenty carbon atoms per molecule. The mercaptans are derived from mixtures of isomeric olefins of structure such that on catalytic addition of hydrogen sulfide, compounds of tertiary configuration are obtained. The so-called "tert-octyl mercaptans," for example, are comprised of many different isomers having eight carbon atoms per molecule. The same condition is true of tert-dodecyl, tert-tetradecyl, and all other mercaptans listed in our preferred range of materials. We have found that mercaptan fractions of narrow boiling range tend to behave as a single substance when used in the additive mixtures employed as initiators and modifiers in this invention.

While primary mercaptans may be employed in a manner similar to our tertiary mercaptans, their effect in the polymerization recipe is much less pronounced. For example, the percentage conversion of monomers over a given reaction period is much lower than that realized with the tertiary compounds and in some cases there is an appreciable reduction in yield over that which is obtained when the diazo thioether is used alone.

In a specific embodiment the emulsion polymerization reactions are carried out by charging the monomers, water, emulsifying agent, and the mixture of diazo thioether and mercaptan to a reactor of conventional design and agitating the reaction mixture continuously while the temperature is held at about 50° C. until the required conversion is attained. At the conclusion of the reaction period any unconverted reactants are recovered by conventional means, the latex is mixed with an oxidation inhibitor such as phenyl-beta-naphthylamine, and the product is broken out of the emulsion by a suitable coagulating agent such as alcohol and brine.

While the diazo thioether-mercaptan mixtures of this invention are applicable as initiators and modifiers in the conventional GR-S recipe (75 parts butadiene-25 parts styrene), they may be employed with equal satisfaction in recipes containing comonomers, such as butadiene and styrene, butadiene and acrylonitrile, butadiene and methacrylonitrile, and the like in varying proportions. These additive mixtures are also particularly effective as initiators and modifiers in the production of high solids latices. By way of illustration of our process the following recipe is included:

| | |
|---|---|
| Butadiene | 51 parts |
| Styrene | 49 parts |
| Water | 180 parts |
| Emulsifying agent | 5 parts |
| Diazo thioether | variable |
| Tert-mercaptan | variable |
| Temperature | 50° C. |
| Time | 40 hours |

The type and amount of diazo thioether used in the additive mixture, as well as the amount of any particular mercaptan employed, will depend largely upon the results desired in a given polymerization recipe. When it is desired to carry out the reaction at temperatures lower than 50° C., for example, temperatures of −10 to 40° C., an active diazo thioether is chosen and frequently one which belongs to the water soluble type is especially satisfactory. For polymerizations to be carried out at higher temperatures, for example, 40 to 60° C., diazo thioethers of moderate activity are chosen while for even higher temperature polymerizations diazo thioethers of low activity are selected. In general, the amount of this additive, based upon 100 parts by weight of monomeric material, is in the range of about 0.05 to 2.0 parts by weight with a range of 0.2 to 0.6 part generally preferred. The amount of mercaptan employed in admixture with the diazo thioether will vary depending upon the particular mercaptan chosen as well as the diazo thioether. The quantity of mercaptan required to produce satisfactory results is usually in the range of 0.08 to 0.40 part by weight based on 100 parts of monomers charged. However, the somewhat narrower range of 0.20 to 0.30 is more frequently referred.

Example I

In order to determine the effect of tertiary mercaptans in an emulsion polymerization reaction containing a diazo thioether, the following recipe was employed:

| | |
|---|---|
| Butadiene | 51 parts |
| Styrene | 49 parts |
| Water | 180 parts |
| Emulsifying agent | 5 parts |
| Diazo thioether | 0.2 part |
| Mercaptan | 0.24–0.3 part |
| Temperature | 50° C. |
| Time | 40 hours |

The emulsifying agent used in this recipe was the sodium salt of sulfonated diamyl succinate, commonly called "Aerosol AY." A series of reactions was carried out under identical conditions except that 0.24 part tert-$C_{12}$ mercaptan was used in admixture with the diazo thioether in one case, 0.24 part primary dodecyl mercaptan in a second case, and 0.3 part tert-$C_{16}$ mercaptan in a third test. A control test was performed in which 0.2 part diazo thioether was added alone. The diazo thioether employed throughout this series of reactions was p-methoxyphenyl diazo-thio-(2-naphthyl)-ether, designated as MDN. The reaction mixture was charged to a reactor where the contents were agitated continuously during a 40-hour period while the temperature was held at 50° C. At the conclusion of the reaction the latex was stabilized in the conventional manner with phenyl-beta-naphthylamine and coagulated with alcohol and brine. The following results were obtained:

| Mercaptan Present | Parts of Mercaptan | Parts of MDN | Conversion, weight percent at— | | | | |
|---|---|---|---|---|---|---|---|
| | | | 3 hrs. | 7 hrs. | 16 hrs. | 24 hrs. | 40 hrs. |
| None | | 0.2 | 3.5 | 9 | 38 | 43 | 45 |
| Primary-$C_{12}$ | 0.24 | 0.2 | 1.5 | 4.5 | 26 | 37 | 50 |
| tert-$C_{12}$ | 0.24 | 0.2 | 3.5 | 9 | 41 | 54 | 58 |
| tert-$C_{16}$ | 0.3 | 0.2 | 4 | 10.5 | 33 | 49 | 58 |

The superior effects of the tertiary mercaptan-diazo thioether mixtures are further shown in Example I in which the percentage conversion is plotted against the polymerization time. While it is obvious that the addition of mercaptans increase the regularity of the reaction rate, it is clearly shown that a very definite increase in the conversion of monomers is realized when tertiary mercaptans are employed. Thus, a 29 per cent increases the regularity of the reaction rate, it is diazo thioether alone, was realized when tertiary mercaptans were employed in the recipe while only an 11 per cent increase was noted when primary $C_{12}$ mercaptan was used.

Example II

A series of runs was carried out using the same materials and proportions as in Example I except that 0.4 part of diazo thioether was added instead of 0.2 part. The polymerization reactions were effected under the same conditions and for the same length of time as that given in Example I. The results of these experiments are given in the subjoined tabulation:

| Mercaptan Present | Parts of Mercaptan | Parts of MDN | Conversion, percent at— | | | | |
|---|---|---|---|---|---|---|---|
| | | | 3 hrs. | 6 hrs. | 16 hrs. | 24 hrs. | 40 hrs. |
| None | | 0.4 | 4 | 10 | 45 | 57 | 57 |
| Primary $C_{12}$ | 0.24 | 0.4 | 2 | 8 | 30 | 48 | 60 |
| tert-$C_{12}$ | 0.24 | 0.4 | 7 | 11 | 48 | 66 | 72 |
| tert-$C_{16}$ | 0.3 | 0.4 | 0 | 7 | 37 | 50 | 69 |

The advantages of the diazo thioether-tertiary mercaptan mixtures over the mixtures with primary $C_{12}$ mercaptan or with the diazo thioether alone are again clearly shown. For example, a 26 per cent increase in the yield, over that obtained with the diazo thioether alone, resulted when tert-$C_{12}$ mercaptan was present while a 21 per cent increase was noted when tert-$C_{16}$ mercaptan was used. In contrast to these results, a 5 per cent increase in monomer conversion was obtained when primary $C_{12}$ mercaptan was employed. Figure 2 is presented to show these data graphically.

We claim:

1. In a process for producing synthetic rubber by polymerization in an aqueous emulsion of a monomeric material comprising a major amount of 1,3-butadiene and a minor amount of styrene, the improvement which comprises effecting said polymerization at a temperature between —10 and 60° C. in the presence of 0.2 to 0.4 part of p-methoxyphenyl diazothio-(2-naphthyl)-ether and of 0.24 to 0.3 part of a tertiary alkyl mercaptan having 12 to 16 carbon atoms per molecule, said parts being parts by weight per 100 parts by weight of said monomeric material, said diazo thioether and said mercaptan being the sole activators and modifiers present.

2. In a process for producing synthetic rubber by polymerization in an equeous emulsion of a monomeric material comprising a major amount of 1,3-butadiene and a minor amount of styrene, the improvement which comprises effecting said polymerization at a temperature between —10 and 60° C. in the presence of 0.2 to 0.4 part of a diazo thioether having the structural formula R—N=N—S—R' where R is a member of the class consisting of aromatic radicals and R' is a member of the class consisting of aromatic, cyclo-alkyl, and aliphatic radicals, and of 0.24 to 0.3 part of a tertiary alkyl mercaptan having 12 to 16 carbon atoms per molecule, said parts being parts by weight per 100 parts by weight of said monomeric material, said diazo thioether and said mercaptan being the sole activators and modifiers present.

JAMES E. PRITCHARD.
CHARLES FREDERICK FRYLING.

References Cited in the file of this patent

UNITED STATES PATENTS

| Number | Name | Date |
|---|---|---|
| 2,251,156 | Nygaard | July 29, 1941 |
| 2,376,963 | Garvey | May 29, 1945 |
| 2,384,547 | Fryling | Sept. 11, 1945 |
| 2,416,440 | Fryling | Feb. 25, 1947 |
| 2,471,742 | Harrison | May 31, 1949 |